June 23, 1964
J. L. POAGE
3,138,141
SWINE HOLDER
Filed April 12, 1963
3 Sheets-Sheet 1
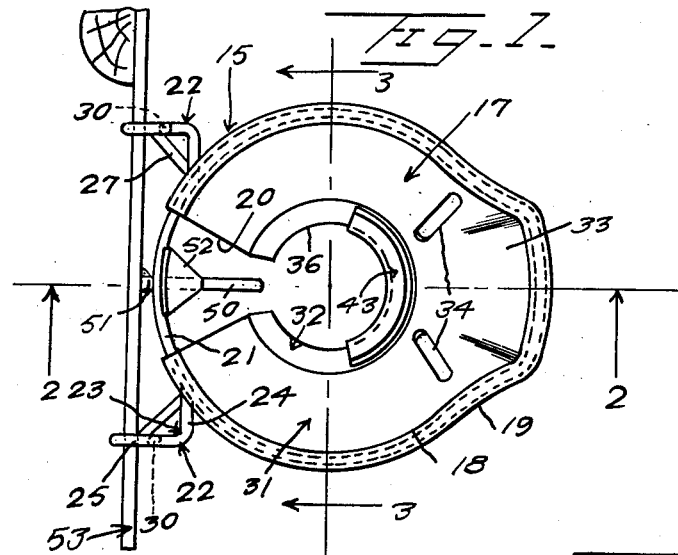
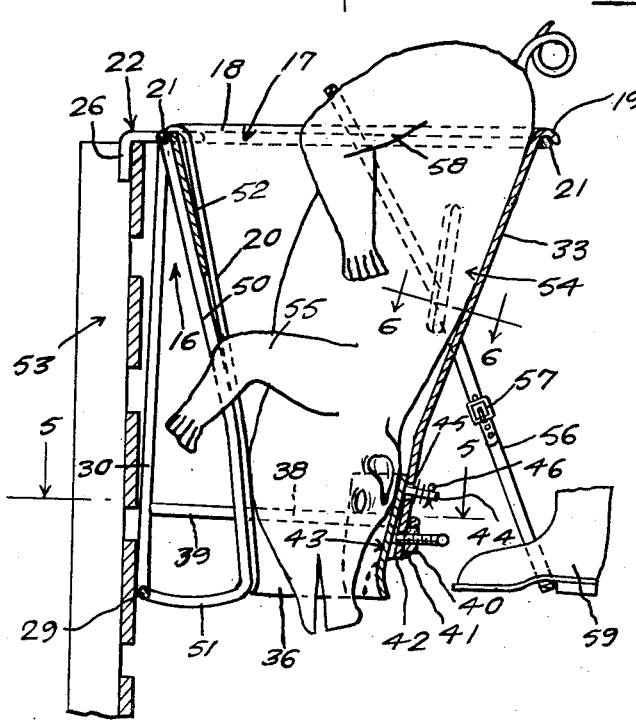
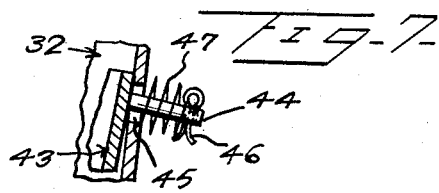
INVENTOR
JESSE L. POAGE
BY John N. Randolph
ATTORNEY

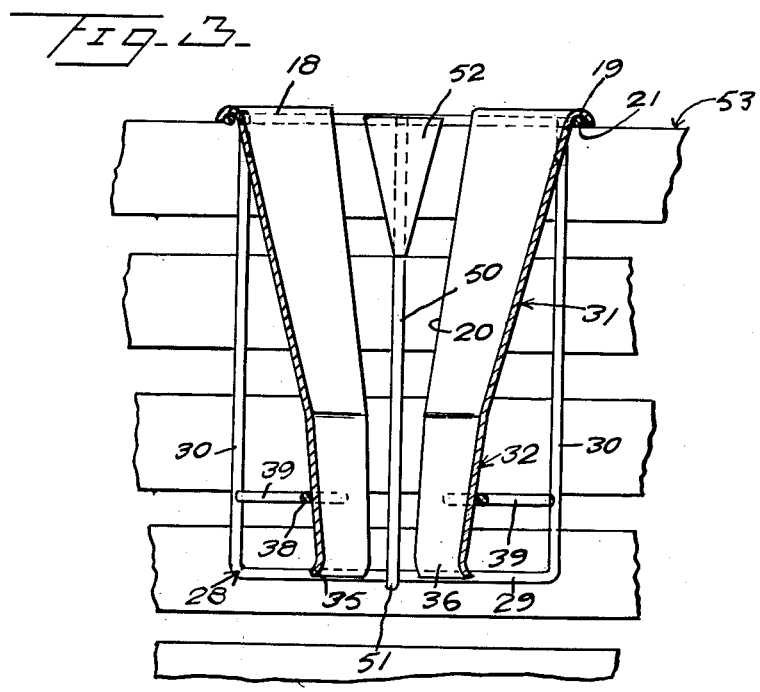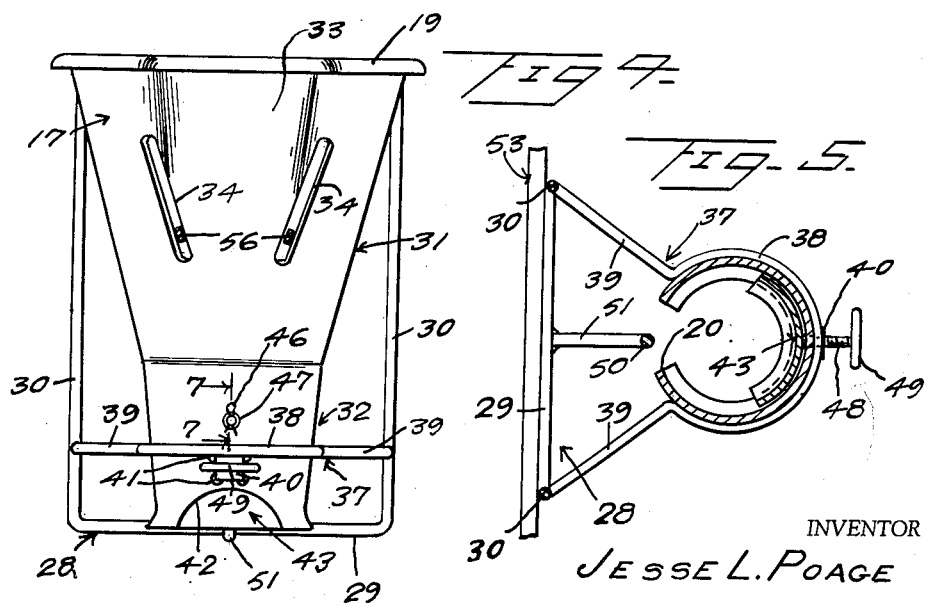

June 23, 1964
J. L. POAGE
3,138,141
SWINE HOLDER
Filed April 12, 1963
3 Sheets-Sheet 3
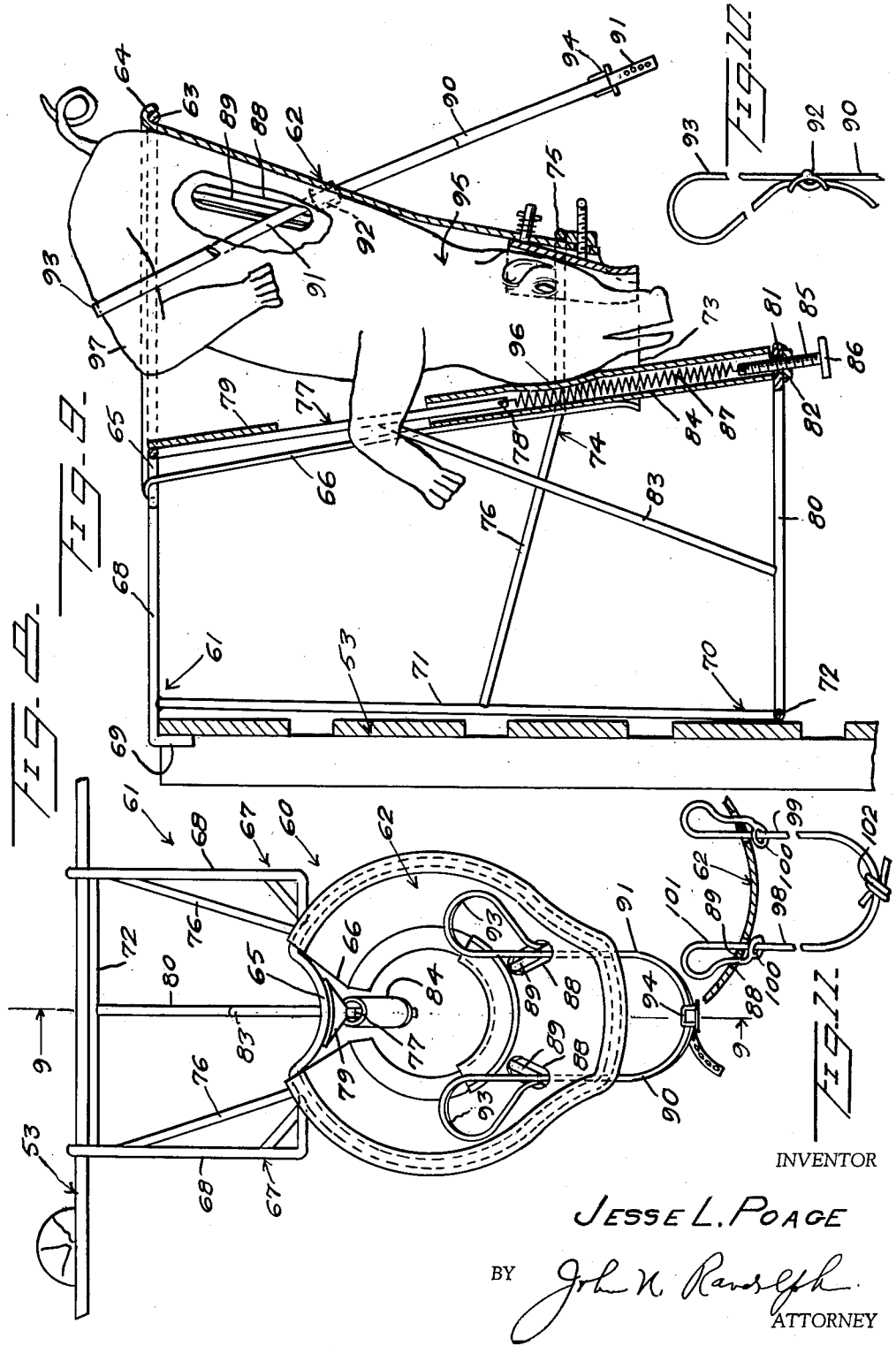
INVENTOR
JESSE L. POAGE
BY John N. Randolph
ATTORNEY

United States Patent Office 3,138,141
Patented June 23, 1964

3,138,141
SWINE HOLDER
Jesse L. Poage, R.R. 2, Perry, Mo.
Filed Apr. 12, 1963, Ser. No. 272,690
11 Claims. (Cl. 119—103)

This invention relates to a holder of extremely simple construction which is capable of being effectively utilized for holding swine while various operations are performed.

Other objects of the invention are to provide a holder to which a swine may be quickly and easily applied or from which the swine can be quickly removed, in which the swine can be quickly and easily secured in a manner to render it completely helpless, and which is so constructed that it will not harm the animal while applied thereto.

A further object of the invention is to provide a swine holder which may be quickly moved from pen to pen, which includes a minimum number of movable parts, which can be readily adjusted to accommodate swine of various sizes from large hogs to small pigs, and which may be easily washed and maintained in a sanitary condition.

Various other objects and advantages of the invention will hereinafter become more fully apparent from the following description of the drawings, illustrating presently preferred embodiments thereof, and wherein:

FIGURE 1 is a top plan view of one embodiment of the swine holder;

FIGURE 2 is a vertical sectional view thereof, taken substantially along a plane as indicated by the line 2—2 of FIGURE 1;

FIGURE 3 is a vertical sectional view taken substantially along a plane as indicated by the line 3—3 of FIGURE 1;

FIGURE 4 is an elevational view, partly in section, looking toward the outer side of the holder;

FIGURE 5 is a horizontal sectional view through the holder, taken substantially along a plane as indicated by the line 5—5 of FIGURE 2;

FIGURE 6 is a fragmentary sectional view, taken substantially along a plane as indicated by the line 6—6 of FIGURE 2, through a part of the holder;

FIGURE 7 is an enlarged fragmentary sectional view taken substantially along a plane as indicated by the line 7—7 of FIGURE 4;

FIGURE 8 is a top plan view of a slightly modified form of the swine holder;

FIGURE 9 is an enlarged substantially central vertical sectional view thereof, taken along a plane as indicated by the line 9—9 of FIGURE 8;

FIGURE 10 is a fragmentary elevational view of one element of the holder, and

FIGURE 11 is a fragmentary sectional view, partly in elevation, of a modified form of the element as shown in FIGURE 10.

Referring more specifically to the drawings, and first with reference to FIGURES 1 to 7, the swine holder in its entirety and comprising the invention is designated generally 15 and includes a supporting frame, designated generally 16, and a holder body, designated generally 17.

The holder body 17 is preferably formed of a rigid sheet material, such as sheet metal, and is generally funnel-shaped. The body 17 has an enlarged open upper end 18 which is provided with an outturned rim 19. The inner portion of the body 17 is defined by a slot 20 which extends from top to bottom of the body 17 and which tapers from its upper to its lower end, as seen in FIGURES 1 and 3.

The frame 16 includes a generally ring-shaped element 21 which extends around the upper portion of the body 17 and which engages in and under the rim 19. A portion of the ring member 21 extends across the upper end of the slot 20. A pair of corresponding hook members 22 are secured to and project from the ring 21 on opposite sides of the slot 20, and each of the hook members 22 including an angular shank 23 composed of substantially right angularly disposed parts 24 and 25. The shank portions 24 extend outwardly from the ring member 21 and are disposed substantially in alignment with one another, while the shank portions 25 project at approximately right angles from the shank portions 24 in a direction away from the ring member 21 and are disposed substantially parallel to one another. The shank portions 25 have downturned terminals 26 forming the bills of the hooks 22. Each hook 22 includes a diagonal brace 27 which extends between and is secured to the shank portions 24 and 25 thereof.

The frame 16 also includes a U-shaped member, designated generally 28, and best seen in FIGURES 3 and 4, which is of a length substantially corresponding to the length of the holder body 17. Said U-shaped member 28 includes a bottom portion 29 and upstanding substantially parallel sides 30 which form substantially right angular extensions of the ends of the bottom portion 29, and the upper ends of which are secured to the shank portions 25 in spaced apart relation to the hook bills 26, as seen in FIGURES 1 and 2.

The holder body 17 includes an upper portion, designated generally 31, and a lower portion, designated generally 32. The upper portion is of substantially greater length than the lower portion and is tapered to a greater extent, as seen in FIGURES 3 and 4. The outer side of the upper portion 31 is flared outwardly, as seen at 33, for a purpose which will hereinafter be described, and the upper portion 31 is provided with longitudinally extending slots 34 which straddle the flared outer portion 33 and which extend downwardly in converging relation to one another. The lower portion 32 has an outwardly flared lower end 35 defining a portion of the open bottom 36 of the holder body 17 and which is substantially smaller than the open top 18 of the holder body.

A brace 37, constituting a part of the supporting frame 16, has an arcuate portion 38 which extends partially around the bottom portion 32, midway of its ends, and end portions 39 which project from the ends of the intermediate portion 38, on opposite sides of the slot 20 and in diverging relation to one another, and which end portions are secured to the sides 30, as seen in FIGURES 3, 4 and 5.

A nut 40 is welded to the intermediate brace portion 38 and is disposed exteriorly of and on the outer side of the lower body portion 32, as seen in FIGURES 2 and 4. Welds 41 connect the nut 40 to the brace portion 38 and to the holder body 17 and also connect the holder body to said brace portion. The outer side of the lower end of the lower body portion 32 is recessed, as seen at 42, in FIGURES 2 and 4, immediately beneath the nut 40, for a purpose which will hereinafter become apparent.

A closure plate 43 is disposed on the inner side of the lower holder portion 32, opposite the slot 20 and is curved transversely to substantially conform to the curvature of the part of the holder on the inner side of which said closure is disposed. A stud 44 is fixed to and projects outwardly from the upper part of the closure 33, midway of its side edges. Said stud 44 extends outwardly through an opening 45 of the holder portion 32, which is disposed above the brace portion 38. A cotter pin 46 engages through the outer part of the stud 44 for confining a coil spring 47 under compression on said stud between the cotter pin and the holder portion 32. A screw 48 is threaded inwardly through the nut 40 and through a part of the lower holder portion 32 and has an inner end which bears against the closure 43, midway of the ends of said closure, as seen in FIGURE 2. The screw 48 has a handle 49 at its outer end to facilitate manual manipulation thereof.

The frame 16 includes a rod member 50 which is secured to and depends from a part of the ring member 21 and which extends from top to bottom of the slot 20 for dividing said slot into substantially equal halves, as seen in FIGURES 1 and 3. The rod member 50 generally follows the contour of the portion of the holder body 17 in which the slot is formed, as seen in FIGURE 2. The rod 50 has an out turned lower end 51 which merges with and is secured to the intermediate portion 29, as seen in FIGURES 2 and 5. A downwardly tapered divider plate 52 is secured to the inner side of the upper portion of the rod 50 for substantially restricting the widths of the divided halves of the upper portion of the slot 20.

The holder 15 is intended to be supported on a fence or pen wall 53 by the hooks 22 being engaged over the top of the fence, as seen in FIGURES 1 and 2, for supporting the holder body 17 on one side of the fence on wall and with the frame member 28 extending down said side and bearing thereagainst, as seen in FIGURE 2. The shank portions 25, their downturned ends 26 and the member 28 define an inner portion of the frame 16 which detachably engages the fence or wall. A pig 54, as seen in FIGURE 2, can be inserted head first downwardly into the holder body 17 through its open top 18 and with the underside of the pig facing toward the slot 20. The forelegs 55 of the pig will extend outwardly of the holder body 17 through the slot 20 and on opposite sides of the rod 50. The divider plate 52 functions to so restrict the halves of the upper portion of the slot 20 that both forelegs 55 cannot be inserted outwardly through the slot on the same side of the plate 52 and to insure that the forelegs will straddle said plate 52 and thereafter the rod 50 as the pig 54 slides downwardly into its position of FIGURE 2, in which position the back of the pig fits substantially conformably in the flared outer portion 33 and the head of the pig bears against the closure plate 43.

A strap 56, which may be elastic as well as flexible, extends through the slots 34 and is adjustably connected by a buckle 57 to provide a loop of a desired length. An upper portion of the strap loop 56, which is disposed internally of the holder body 17, engages around the hind legs 58 of the animal 54, and the operator places his foot 59 in the lower part of the loop 56 for exerting a downward pressure on the loop for holding the hind legs confined, as seen in FIGURE 2. The pig 54 thus positioned is held immobile while being operated upon. The fact that the forelegs 55 extend outwardly through the slot 20 but are unable to contact the fence or wall 53 prevents the pig from obtaining any puchase with his forelegs and by which the pig might dislodge himself from the holder 15.

The pig 54 while held as seen in FIGURE 2 may be operated upon, castrated, or may have a nose ring applied. For smaller pigs than the one illustrated, the screw 48 may be advanced inwardly to cause the closure plate 43 to be swung inwardly to restrict the open bottom 36 to a desired extent so that smaller pigs will be prevented from sliding too far down into the holder body 17. As seen in FIGURE 7, the opening 45 is sufficiently large so that the stud 44 can slide and rock therein to allow this inward rocking movement of the closure plate. The spring 47 normally urges the closure plate to swing outwardly. The recessed edge portion 42 is provided to eliminate a part of the holder which might otherwise afford an obstruction in applying nose rings.

FIGURES 8, 9 and 10 illustrate a slightly modified form of the swine holder, designated generally 60, including a supporting frame 61 and a holder body, designated generally 62.

The frame 61 includes an endless ring member 63 which engages under the rim 64 of the top of the holder body, which rim corresponds to the rim 19. The ring 63 differs from the ring 21 in that it has an inwardly bowed inner portion 65 spanning the slot 66 of the holder body 62, which corresponds to the slot 20. The supporting frame 61 includes hook members 67 which replace the hook members 22 and which differ therefrom only in that the parallel shank portions 68 thereof are substantially longer than the shank portions 25, which said shank portions 68 replace. The shank portions 68 terminate in downturned hook bills 69. A U-shaped member 70 replaces the U-shaped member 28 and has the upper ends of its substantially parallel legs 71 secured to the shank portions 68, in the same manner as the legs 30 are secured to the shank portions 25, at approximately the same distance from the hook bills. The U-shaped member 70 differs from the U-shaped member 28 in that its bottom intermediate portion 72 is disposed below the level of the open lower end 73 of the holder body 62. A brace 74 has an intermediate portion 75 which embraces the holder body 62 near to its lower end and which is secured thereto in the same manner that the brace portion 38 is secured to the holder body 17. The brace 74 has legs 76 which diverge from the ends of the intermediate portion 75 and the terminals of which are secured to the legs 71. The brace legs 76 are longer than the brace legs 39 which they replace.

A rod 77 is fixed to and extends downwardly from the portion 65, intermediate of the ends thereof, and has a lower end 78 which terminates somewhat above the open lower end 73 of the holder body. The rod 77 replaces the rod 50 and has a plate 79 secured to the inner side of its upper portion and which corresponds to and performs the same function as the plate 52. As best seen in FIGURE 9, the rod 77 is inwardly offset relative to the slot 66 and is disposed substantially parallel thereto. A bottom brace rod 80 is fixed to and extends outwardly from the intermediate part of the bottom portion 72 and has an opening 81 adjacent its free end. A nut 82 is secured to the underside of the brace 80 around the opening 81. A diagonal brace 83 is fixed to and extends upwardly and outwardly from the intermediate portion of the bottom brace 80 and has an upper end secured to the rod 77 at a point spaced a substantial distance above the lower end 78 thereof.

A piece of tubing, such as rubber hose 84, which is flexible has an upper end engaging over the part of the rod 77 disposed below the upper end of the brace 83, and a lower end which rests upon the brace 80, around the opening thereof. A bolt or screw 85 is threaded upwardly through the nut 82 and extends upwardly through the opening 81 into the lower portion of the tube 84, and has a handle 86 at its lower end by which the screw 85 can be manually adjusted. A contractile coiled spring 87 is disposed within a portion of the tube 84 and has an upper end secured to the rod end 78 and a lower end secured to the upper end of the screw 85.

The holder body 62 has longitudinally extending slots 88 which are disposed in the same positions as the slots 34. However, each slot 88 is divided longitudinally by a rod 89.

Two flexible straps 90 and 91 are each provided with a buckle or fastener 92, as seen in FIGURE 10, by which an adjustable loop 93 is formed in one end thereof. Each loop 93 extends through a slot 88 and straddles the rod 89 thereof for supporting the straps in engagement with said slots. The other end of the strap 90 has a buckle 94 to which the other end of the strap 91 is adjustably connected.

The holder body 62 otherwise corresponds with the holder body 17 and a swine 95 is applied thereto and removed therefrom in the same manner that the pig or swine 54 is applied to the holder body 17. However, the tube 84 and the spring 87 encased thereby yieldably and conformably engage against the chin 96 of the swine, as seen in FIGURE 9, and the pressure exerted thereby on the chin may be varied by the adjusting the screw 85. The tube 84 prevents direct contact of the spring 87 with the chin 96 and which might cause pinching or other discomfort. Furthermore, said tube can slide to some extent when in contact with the chin during application of the swine to the holder body 62 or during removal therefrom. The loops 93 are raised and engaged around the hind legs 97, so that the two hind legs are not only drawn downwardly and confined but are pulled away from one another, so that the underside of the animal is held in a more accessible manner for performing certain operations, such as an operation for rupture. The straps 90 and 91 may be applied to the holder body 62 together with a strap 56, so that either may be employed, depending upon the operation to be performed on the swine.

FIGURE 11 illustrates a slight modification of the straps 90 and 91, and wherein two lengths of heavy cord or rope 98 and 99 are employed, each having an eye 100 at one end thereof. The other end of the rope or cord is passed back through the eye 100 to form a loop 101 which engages through one of the slots 88 and around one of the rods 89 in the same manner as the loop 93. The other ends of the cords 98 and 99 can be adjustably connected together by a knot 102 in which the foot is placed, in the same manner as shown in FIGURE 2, and in the same manner that a foot engages the straps 90 and 91 adjacent the buckle 94.

Various other modifications and changes are contemplated and may be resorted to, without departing from the function or scope of the invention as hereinafter defined by the appended claims.

I claim as my invention:

1. A swine holder comprising a frame having an inner portion adapted to detachably engage a fence or wall for supporting the holder, a substantially funnel-shaped holder body in which a swine is adapted to be detachably supported head down, said holder body being of substantially rigid unitary construction, said frame having parts extending outwardly from said inner portion and embracing and secured to longitudinally spaced portions of said holder body, and said holder body having a slot extending longitudinally thereof and facing toward and spaced from said inner portion of the frame in which the forelegs of the swine are confined.

2. A swine holder comprising a frame having an inner portion adapted to detachably engage a fence or wall for supporting the holder, a substantially funnel-shaped holder body in which a swine is adapted to be detachably supported head down, said frame having parts extending outwardly from said inner portion and embracing and secured to vertically spaced portions of said holder body, said holder body having a slot extending longitudinally thereof and facing toward and spaced from said inner portion of the frame in which the forelegs of the swine are confined, and said frame including means extending longitudinally of said slot for dividing the slot longitudinally in half and which means is adapted to be straddled by the forelegs of the swine.

3. A swine holder as in claim 2, said means substantially conforming to the contour of the slotted portion of said holder body and including a yieldable lower portion adapted to engage the throat of the swine.

4. A swine holder as in claim 1, a closure member yieldably mounted in the lower end of the holder body opposite to the slot and adapted to be engaged by the head of the swine, and means for adjustably positioning said closure member for restricting the lower end of the holder body to accommodate swine of different sizes.

5. A swine holder as in claim 4, the lower end of said holder body being recessed around said closure member to facilitate the application of a nose ring to the swine.

6. A swine holder comprising a frame having an inner portion adapted to detachably engage a fence or wall for supporting the holder, a substantially funnel-shaped holder body in which a swine is adapted to be detachably supported head down, said frame having parts extending outwardly from said inner portion and embracing and secured to vertically spaced portions of said holder body, said holder body having a slot extending longitudinally thereof and facing toward and spaced from said inner portion of the frame in which the forelegs of the swine are confined, the upper part of said holder body remote from said slot having transversely spaced slots, and strap means engaging through said last mentioned slots and extending into the holder body and adapted to engage and confine the hind legs of the animal within the holder body.

7. A swine holder as in claim 6, said strap means comprising an elongated adjustable loop.

8. A swine holder comprising a frame having an inner portion adapted to detachably engage a fence or wall for supporting the holder, a substantially funnel-shaped holder body in which a swine is adapted to be detachably supported head down, said frame having parts extending outwardly from said inner portion and embracing and secured to vertically spaced portions of said holder body, said holder body having a slot extending longitudinally thereof and facing toward and spaced from said inner portion of the frame in which the forelegs of the swine are confined, the upper part of said holder body remote from said slot having transversely spaced slots, strap means engaging through said last mentioned slots and extending into the holder body and adapted to engage and confine the hind legs of the animal within the holder body, said strap means including adjustable hind leg engaging loops, and means carried by the holder body and engaging said loops for supporting said strap means on the holder body.

9. A swine holder comprising a frame having an inner portion adapted to detachably engage a fence or wall for supporting the holder, a substantially funnel-shaped holder body in which a swine is adapted to be detachably supported head down, said frame having parts extending outwardly from said inner portion and embracing and secured to vertically spaced portions of said holder body, said holder body having a slot extending longitudinally thereof and facing toward and spaced from said inner portion of the frame in which the forelegs of the swine are confined, and means for restricting the open lower end only of said holder body for accommodating swine of different sizes and in different positions in the holder body.

10. A swine holder as in claim 1, an upper portion of said holder body having an outwardly flared portion disposed opposite to said slot and adapted to conformably engage the back of the swine.

11. A swine holder as in claim 1, an upper portion of said holder body being tapered to a greater extent and being of a greater length than a lower portion thereof.

References Cited in the file of this patent

UNITED STATES PATENTS

| | | |
|---|---|---|
| 2,122,731 | Summers | July 5, 1938 |
| 2,789,538 | Merritt | Apr. 23, 1957 |
| 2,914,026 | Greenwood | Nov. 24, 1959 |
| 2,929,357 | Hoyme et al. | Mar. 22, 1960 |